United States Patent
McVay et al.

(10) Patent No.: US 11,332,303 B2
(45) Date of Patent: *May 17, 2022

(54) CORROSION-RESISTANT EPOXIDIZED VEGETABLE OIL CAN INTERIOR COATING

(71) Applicant: PPG Industries Ohio, Inc., Cleveland, OH (US)

(72) Inventors: Robert McVay, Cincinnati, OH (US); Christopher L. Most, Wilder, KY (US); Hannah Elizabeth Toomey, Cincinnati, OH (US); Sarah Cunningham, Batavia, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,501

(22) Filed: May 22, 2020

(65) Prior Publication Data
US 2020/0354140 A1 Nov. 12, 2020

Related U.S. Application Data

(63) Continuation of application No. 15/278,061, filed on Sep. 28, 2016, now Pat. No. 10,703,920.

(51) Int. Cl.
| | |
|---|---|
| B65D 1/12 | (2006.01) |
| B65D 85/42 | (2006.01) |
| F21V 31/00 | (2006.01) |
| B65D 25/54 | (2006.01) |
| F21W 131/402 | (2006.01) |
| C09D 183/04 | (2006.01) |
| B05D 7/22 | (2006.01) |
| C08G 77/04 | (2006.01) |
| C09D 5/08 | (2006.01) |
| C09D 191/00 | (2006.01) |

(52) U.S. Cl.
CPC .............. *B65D 85/42* (2013.01); *B65D 1/12* (2013.01); *B65D 25/54* (2013.01); *F21V 31/00* (2013.01); *B05D 7/227* (2013.01); *C08G 77/04* (2013.01); *C09D 5/08* (2013.01); *C09D 183/04* (2013.01); *C09D 191/00* (2013.01); *F21W 2131/402* (2013.01)

(58) Field of Classification Search
CPC .. C09D 183/04; C09D 177/00; C09D 133/04; C09D 5/08; B65D 1/12; B05D 7/227
See application file for complete search history.

(56) References Cited

U.S. PATENT DOCUMENTS

| | | | | |
|---|---|---|---|---|
| 2,258,222 A | * | 10/1941 | Rochow | C08G 77/06 428/390 |
| 3,119,712 A | | 1/1964 | Esswein, Jr. | |
| 3,240,736 A | * | 3/1966 | Beckwith | C08L 63/00 524/2 |
| 3,318,808 A | | 5/1967 | Plemich et al. | |
| 3,334,057 A | | 8/1967 | Marks et al. | |
| 3,850,872 A | * | 11/1974 | Marzocchi | C08K 7/14 523/213 |
| 4,623,680 A | * | 11/1986 | Azarnia | C08G 59/1455 423/100 |
| 4,736,010 A | | 4/1988 | Suzuki et al. | |
| 5,318,808 A | | 6/1994 | Crivello et al. | |
| 7,475,786 B2 | | 1/2009 | McVay | |
| 8,481,622 B2 | | 7/2013 | Flanigan et al. | |
| 8,927,652 B2 | | 1/2015 | Most et al. | |
| 9,038,849 B2 | | 5/2015 | Most et al. | |
| 9,133,292 B2 | | 9/2015 | Craun et al. | |
| 9,181,379 B2 | | 11/2015 | Backer et al. | |
| 9,260,625 B2 | | 2/2016 | Li et al. | |
| 9,273,232 B2 | | 3/2016 | Tynan, Jr. | |
| 9,752,044 B2 | * | 9/2017 | Most | C09D 5/08 |
| 10,392,515 B2 | * | 8/2019 | Ghantous | C09D 5/08 |
| 2004/0039106 A1 | * | 2/2004 | Man | C08L 27/06 524/525 |
| 2008/0302694 A1 | | 12/2008 | Gardner et al. | |
| 2014/0183089 A1 | | 7/2014 | Mayr et al. | |
| 2015/0050439 A1 | * | 2/2015 | Most | C09D 133/08 428/35.7 |
| 2015/0183930 A1 | * | 7/2015 | Hsueh | C08K 3/22 523/400 |
| 2017/0002242 A1 | * | 1/2017 | Yane | C08G 73/1035 |
| 2019/0062565 A1 | * | 2/2019 | Ghantous | C09D 193/02 |

FOREIGN PATENT DOCUMENTS

| | | |
|---|---|---|
| EP | 2751201 | 7/2014 |
| EP | 2794704 | 10/2014 |
| EP | 2152796 | 8/2015 |
| EP | 2794703 | 7/2016 |
| JP | 51075733 | 6/1976 |
| JP | 56102973 | 8/1981 |
| JP | 04183757 | 6/1992 |
| JP | 2003221554 | 8/2003 |
| KR | 1020160042135 A | 4/2016 |
| KR | 1020160075682 A | 6/2016 |
| WO | 0000533 | 1/2000 |
| WO | 2015023914 A1 | 2/2015 |
| WO | 2015059253 A1 | 4/2015 |
| WO | 2015061664 | 4/2015 |
| WO | 2016105502 | 6/2016 |

* cited by examiner

*Primary Examiner* — Margaret G Moore
(74) *Attorney, Agent, or Firm* — Michael J. Grese

(57) ABSTRACT

A coating composition comprising epoxidized vegetable oil, an amine terminated polyamide and a silicone resin is disclosed. Substrates coated at least in part with such coatings are also disclosed.

17 Claims, No Drawings

CORROSION-RESISTANT EPOXIDIZED VEGETABLE OIL CAN INTERIOR COATING

This application is a Continuation Application of U.S. application Ser. No. 15/278,061, now U.S. Pat. No. 10,703,920.

FIELD OF THE INVENTION

The present invention is directed to coating compositions comprising epoxidized vegetable oil, an amine terminated polyamide and a silicone. Substrates, including packages, coated at least in part with such a coating are also within the scope of the present invention.

BACKGROUND OF THE INVENTION

The application of various polymeric coatings to metallic substrates, including metal cans such as food, beverage and cosmetic containers, to retard or inhibit corrosion is well established. Coatings are applied to the interior of such containers to prevent the contents from contacting the metal of the container. Contact between the metal and the food, beverage or cosmetic can lead to corrosion of the metal container, which can then contaminate the product. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. A reduced use of formaldehyde in coatings is also desired.

SUMMARY OF THE INVENTION

The present invention is directed to a coating comprising: a. epoxidized vegetable oil; b. an amine terminated polyamide; and c. a silicone resin; wherein the composition comprises 5 wt % or greater vegetable soy bean oil based on the total solid weight of the composition.

DETAILED DESCRIPTION OF THE INVENTION

The present invention is directed to a coating composition comprising an epoxidized vegetable oil, an amine terminated polyamide, and a silicone resin.

Any suitable epoxidized vegetable oil ("EVO") can be used, and can either be obtained commercially or prepared by epoxidizing a vegetable oil. Vegetable oils include but are not limited to corn, cottonseed, linseed, rapeseed, tall, palm, peanut, sesame, sunflower, and soy. Epoxidized soy bean oil ("ESBO") is particularly suitable and is commercially available from a number of sources, such as Hallstar, as PLAST-HALL ESO, and Arkema, in its VIKOFLEX line, such as VIKOFLEX 7170. ESBO and other epoxidized vegetable oils are known as plasticizers in materials using vinyl chlorides. It was surprisingly discovered that a coating composition comprising EVO with an amine terminated polyamide imparts greater corrosion resistance to a metal substrate when such composition is cured as compared to a cured composition having only EVO or only an amine terminated polyamide. The amount of EVO in the present compositions can vary, such as 5 wt % or greater, 7.5 wt % or greater, 10 wt % or greater or 12 wt % or greater, and such as 20 wt % or lower or 15 wt % or lower, with wt % based on the total solids weight of the composition. A wt % of 10-12 may be particularly suitable.

Any amine terminated polyamide can be used according to the present invention. The polyamide, for example, can be based on a dimer acid. Suitable amine values for the polyamide can vary based on the needs of the user and can range, for example from 220 to 250, such as 232 to 242, as determined by titration with HBr in HBr/Acetic acid using methyl violet indicator. The viscosity of the polyamide can also vary, and can range, for example, from 400 to 800 poise, such as 550 to 700 poise, when measured with a #3 spindle at 20 RPM by Brookfield viscometer at 40° C. Polyamides are widely commercially available, such as from Hexion in their EPIKURE line. The amount of amine terminated polyamide in the present compositions can vary, such as 2 wt % or greater, 3.5 wt % or greater, or 5 wt % or greater, and such as 15 wt % or lower, 12.5 wt % or lower, or 10 wt % or lower, with wt % based on the total solids weight of the composition. A wt % of 3 to 12 may be particularly suitable.

The silicone resin used according to the present invention may also vary based on the needs of the user. Combinations of silicone resins may also be used. Particularly suitable are silsesquioxane resins, including silanol functional silsesquioxanes. Suitable silicone resins, including silanol functional silsesquioxanes, are commercially available from Dow Chemical in their RSN line. RSN 217, for example, is a fully phenylated silanol functional silsesquioxane and with a degree of substitution of 1.0. RSN 233, for example, is a silanol functional silsesquioxane with a phenyl to methyl ratio of 1.3:1 and a degree of substitution of 1.15. RSN 255, for example, is also a silanol functional silsesquioxane with a phenyl to methyl ratio of 0.84:1 and a degree of substitution of 1.05. All of these values are as reported by the manufacturer, Dow. The amount of silicone resin in the present compositions can vary, such as 10 wt % or greater, 15 wt % or greater, 20 wt % or greater or 25 wt % or greater, and such as 60 wt % or lower or 50 wt % or lower or 40 wt % or lower, with wt % based on the total solids weight of the composition. A wt % or 15 to 50 may be particularly suitable.

The coating compositions of the present invention may further comprise a film-forming component. A film forming component may include, for example, a film forming resin and a crosslinker therefor. Any film forming resin can be used according to the present invention. The film-forming resin can comprise, for example, an acrylic polymer, a polyester polymer, a polyurethane polymer, a polyamide polymer, a polyether polymer, a polysiloxane polymer, copolymers thereof, and mixtures thereof. Generally, these polymers can be any polymers of these types made by any method known to those skilled in the art. Such polymers may be solvent-borne or water-dispersible, emulsifiable, or of limited water solubility. The film forming resin will typically have functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present compositions. The film forming component may also comprise a crosslinker, having functional groups reactive with the functional groups on the resin. One skilled in the art can select an appropriate crosslinker based on this functionality from crosslinkers such as melamine such as melamine formaldehyde resin, phenolic such as phenolic formaldehyde resin and/or cresol formaldehyde phenolic resin, carbodiimide, hydroxyalkylamide, hydroxyalkyurea, isocyanate, blocked isocyanate, benzoguanamine, TGIC, epoxies, oxazolines, and the like. The film forming resin may also be self crosslinking; that is, the resin will react with itself to cure. Examples of such resins include polysiloxane resins that contain silanol (Si—OH), alkoxy groups (Si—O—R), or acetoxy groups (Si—O—COCH3), which can condense or become reactive due to the presence of moisture and heat to self-condense.) The film forming resin can be used in an amount of 20 wt % or greater, such as 30 wt % or greater or 40 wt % or greater, and such as 60 wt % or lower, 50 wt % or lower or 40 wt % or lower, with wt % based on the total solid weight of the composition. A wt % of 20 to 50 may be particularly suitable.

A particularly suitable film forming resin is an acrylic resin. The acrylic resin, for example, may be formed by using any number of acrylic monomers, including styrene, alkyl (meth) acrylates such as ethyl (meth)acrylate, methyl (meth)acrylate, and butyl (meth)acrylate, functional acrylates such as hydroxyethyl (meth)acrylate, cyclic and polycyclic (meth)acrylics such as benzyl (meth)acrylate, cyclohexyl (meth)acrylate and isobornyl (meth)acrylate, and acrylamides such as N-butoxy methyl acrylamide (N-BMA). For example, an acid functional (meth)acrylic acid and an alkyl (meth)acrylate may each be used. Mixtures of (meth) acrylic resins can also be used. It will be understood that (meth)acrylic and like terms refers to both methacrylic and acrylic. According to the present invention, the acrylic resin and/or the coating compositions themselves may exclude hydroxyl functional acrylic monomers, styrene and/or vinyl chloride monomers. The acrylic resin and/or the coating compositions themselves may exclude ethyl acrylate and/or acrylamides, such as N-BMA. In addition, when using an acrylic resin in the present compositions, the (meth)acrylic resin will not generally contain unreacted unsaturation. That is, reaction of the (meth)acrylic monomers in the formation of the (meth)acrylic resin will consume the unsaturation. Thus, the (meth)acrylic resins used according to the present invention are not radiation curable, and any residual unsaturation that might remain in the (meth)acrylic resin upon reaction of the monomers is not enough to render the (meth)acrylic radiation curable.

As noted above, the present compositions may comprise a crosslinker, including one or more crosslinkers. Benzoguanamine is a particularly suitable crosslinker and, if used, can be present in the composition in an amount of 5 wt % or greater, such as 7.5 wt % or greater or 10 wt % or greater, and such as 35 wt % or less, 30 wt % or less, or 25 wt % or less, with wt % based on the total solids weight of the composition. A wt % of 10 to 30 is particularly suitable.

A phenolic resin or crosslinker, such as a phenol formaldehyde resin, can also be included in the present compositions, either alone or in conjunction with another crosslinker. For certain applications, however, it may be desired to minimize, if not eliminate, the amount of phenolic used in coating compositions in the packaging industry. It will be appreciated that phenolics are often made with formaldehyde and therefore bring formaldehyde into the composition. It was surprisingly discovered that the amount of phenolic can be minimized, and even eliminated, in compositions also comprising EVO, particularly ESBO, amine terminated polyamide, and silicone resin, such as described above. For example, a typical commercial coating composition may contain 50 wt % phenolic. Coating compositions of the present invention may contain 30 wt % or less of phenolic resin, such as 25 wt % or less, 20 wt % or less, 15 wt % or less, 10 wt % or less, 5 wt % or less, 2 wt % or less, or 1 wt % or less. The compositions may also be completely free of phenolic, which will be understood as referring to being completely free of any added phenolic, with any trace amounts of phenolic brought in through other coating components.

As noted above, the present compositions comprise EVO. The EVO can be pre-reacted with another coating component or can react with another coating component upon cure of the coating composition. For example, it may be desired that the EVO is not pre-reacted with any of the other coating components in the composition and undergoes reaction with the amine terminated polyamide only upon heat cure. Upon curing with heat the oxirane functionality of the EVO reacts with the primary amine of the amine terminated polyamide to form a hydroxyl and a secondary amine. The reaction during cure is particularly suitable for applications regulated by the FDA. Alternatively, and particularly when FDA considerations are not relevant, the EVO can be pre-reacted with the amine terminated polyamide, or any other coating component, prior to cure. The EVO does not undergo transesterification with any other component, and is not a plasticizer or hydrogen chloride scavenger.

The coating composition may comprise one or more solvents including water or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". The composition may be aqueous or water-based. This means that 50% or more of the solvent is water. These embodiments have less than 50%, such as less than 20%, less than 10%, less than 5% or less than 2% solvent. The coating compositions of the present invention are more suitably water based.

If desired, the compositions can comprise other optional materials well known in the art of formulating, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents, moisture scavenger and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used.

As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 wt % of the present compositions, such as from 3 to 40 wt % or 5 to 35 wt %, with weight percent based on the total weight of the composition.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning. A wax can also be used such as polyolefin wax, silicone or paraffin.

The coating compositions of the present invention, may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the components and/or the coating compositions themselves contain less than 1000 parts per million (ppm), "essentially free" means less than 100 ppm and "completely free" means less than 20 parts per billion (ppb) of any of the above mentioned compounds, derivatives or residues thereof.

The present compositions can be applied to any substrates known in the art, for example, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, glass and transparencies, sports equipment including golf balls, and the like. Accordingly, the present invention is further directed to a substrate coated at least in part with any of the coating compositions described above. These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

The compositions of the present invention can be applied by any means standard in the art, such as electrocoating, spraying, electrostatic spraying, dipping, rolling, brushing, and the like.

The compositions can be applied to a dry film thickness of 0.04 mils to 4 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application. As noted above, the present compositions can be thermoplastic or thermo setting.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, airplanes, helicopters, boats of any size and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors, trunk lid and the like, but may also be applied to other areas such as inside the trunk, inside the door and the like especially when the compositions are formulated as sealants or adhesives; they can also be applied to those portions of the car that are in contact with the driver and/or passengers, such as the steering wheel, dashboard, gear shift, controls, door handle and the like. Clearcoats will typically be applied to the exterior of a vehicle.

The compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food, beverage or cosmetic, for example, can lead to corrosion of a metal container, which can then contaminate the food, beverage or cosmetic. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content and/or that are high in acidity. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, cosmetics, such as personal care products, bug spray, spray paint, and any other compound suitable for packaging in an aerosol can. The cans can include "two piece cans" and "three-piece cans" as well as drawn and ironed cans; such cans often find application with aerosol products. Packages coated according to the present invention can also include plastic bottles, plastic tubes, laminates and flexible packaging, such as those made from PE, PP, PET and the like. Such packaging could hold, for example, food, toothpaste, other personal care products and the like.

The present invention is also directed to a package coated with a coating comprising silicone at a wt % of 10 or greater, such as 15 wt % or greater or 20 wt % or greater, where wt % is based on the weight of solids, and wherein the package has a food release value of 90 percent or greater measured after four weeks in hot storage at 120° F. A method for measuring such food release is described in the examples.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

After application to the substrate, the coating composition may be cured by any appropriate means. In some applications a cure of 425° F. or lower, such as 415 or lower or 400 or lower for 5 minutes or less, such as 4.5 minutes or less may be desired and can be achieved according to the present invention. Accordingly, the present coatings can be used across a broad range of industries and cure conditions.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" silicone resin, "an" amine terminated polyamide, "an" EVO, "a" film forming component, "a" film forming resin, "a" crosslinker and the like, one or more of each of these and any other components can be used. As used herein, the term "polymer" refers to oligomers and both homopolymers and copolymers, and the prefix "poly" refers to two or more. (Meth)acrylic, and like terms, refers to both acrylic and methacrylic. Including, for example and like terms means including, for example, but not limited to. When ranges are given, any endpoints of those ranges and/or numbers within those ranges can be combined within the scope of the present invention. When maximum and minimum amounts are given, any such amounts can be combined to specify ranges of ingredients numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the invention include:
1. A coating comprising:
   a. epoxidized vegetable oil;
   b. an amine terminated polyamide; and
   c. a silicone resin; wherein the composition comprises 5 wt % or greater epoxidized vegetable oil, where wt % is based on the total solid weight of the composition.
2. The coating composition of Aspect 1, wherein the epoxidized vegetable oil comprises epoxidized soy bean oil.
3. The coating composition of any of the preceding Aspects, wherein the composition comprises 10 to 13 wt % epoxidized soy bean oil, based on the total solid weight of the composition.
4. The coating of any of the preceding Aspects, wherein the polyamide has an amine value of 220 to 250, as determined by titration with HBr in HBr/Acetic acid using methyl violet indictor.
5. The coating composition of any of the preceding Aspects, wherein the silicone comprises a silanol functional silsesquioxane silicone resin.
6. The coating composition of any of the preceding Aspects, further comprising 30 wt % or less phenolic resin, where weight percent is based on the total solid weight of the coating.
7. The coating composition of Aspect 6, wherein the composition has 10 wt % or less phenolic resin, where wt % is based on the total solids weight of the coating.
8. The coating composition of Aspect 6, wherein the composition has 5 wt % or less phenolic resin, where wt % is based on the total solid weight of the coating.
9. The coating composition of Aspect 6, wherein the composition has 1 wt % or less phenolic resin, where wt % is based on the total solid weight of the coating.
10. The coating composition of any of the preceding Aspects, further comprising an acrylic resin.
11. The coating composition of Aspect 10, wherein the acrylic resin comprises structural units derived from (meth) acrylic acid and alkyl (meth)acrylate.
12. The coating composition of Aspect 10 or 11, wherein the acrylic resin comprises a cyclic (meth)acrylate.
13. The coating composition of any of the preceding Aspects, further comprising benzoguanamine.
14. The coating composition of any of the preceding Aspects, wherein the composition and/or components thereof are substantially free, essentially free, or completely free of BPA, and derivatives thereof.
15. The coating composition of any of the preceding Aspects, wherein the composition and/or components thereof are substantially free, essentially free, or completely free of BPF, and derivatives thereof.
16. The coating composition of any of the preceding Aspects, wherein the composition and/or components thereof are substantially free, essentially free, or completely free of hydroxyl functional acrylic monomers.
17. The coating composition of any of the preceding Aspects, wherein the composition and/or components thereof are substantially free, essentially free, or completely free of styrene.
18. The coating composition of any of the preceding Aspects, wherein the composition and/or components thereof are substantially free, essentially free, or completely free of vinyl chloride monomers.
19. The coating composition of any of the preceding Aspects, wherein the composition and/or components thereof are substantially free, essentially free, or completely free of ethyl acrylate.
20. The coating composition of any of the preceding Aspects, wherein the composition and/or components thereof are substantially free, essentially free, or completely free of acrylamide, such as N-BMA.
21. A substrate coated at least in part with the coating composition any of the preceding Aspects.
22. The substrate of Aspect 14, wherein the substrate comprises a package.
23. The package of Aspect 15, wherein the package is a metal can.
24. The package of Aspect 16, wherein the metal can is a food can or beverage can.
25. The package of Aspect 16, wherein the food can or beverage can is coated on the inside with the coating composition of any Aspects 1-12.
26. The package of Aspect 17, wherein the efficiency of food release from the metal can is greater than the efficiency of food release from a metal can coated with a coating without silicone.

EXAMPLES

The following examples are intended to illustrate the invention and should not be construed as limiting the invention in any way.

Example 1

Coating composition A was made by mixing the ingredients shown below in a Cowels type mixer at high speed, 1100 rpm.

| Coating A Resin Solids | |
|---|---|
| cresol phenolic A[1] | 26.4 |
| Acrylic A | 5 |
| Epoxidized soya bean oil | 10 |
| Epikure 3115[3] | 3.6 |
| Acrylic B | 20 |
| Cymel 5010[2] | 10 |
| RSN 217 silicone[4] | 25 |
| | 100 |

[1]cresol phenolic A = PR 516 from Allnex 62% solids
[2]Cymel 5010 = Benzoganime from Allnex
[3]Epikure 3115 = amine terminated polyamide
[4]RSN217 = Silsesquioxane silicone from Dow Chemical

| Acrylic A Solids | |
|---|---|
| Styrene | 25% |
| Ethyl acrylate | 53% |
| Methacrylic acid | 22% |
| | 100% |

| Acrylic B Solids | |
|---|---|
| Styrene | 25% |
| Ethyl Acrylate | 42% |
| Methacrylic acid | 33% |
| | 100% |

The mixture as prepared above was dispersed in water to 30% solids and a viscosity of 21 seconds as measured using a Ford cup #4 at a temperature of 78° F.

| Coating A Solution in Water | |
|---|---|
| cresol phenolic A @ 62% solids in butanol | 426 |
| Acrylic A @ 52% solids in butyl cellosolve | 96 |
| Epoxidized soya bean oil | 100 |
| Epikure 3115 @ 80% solids in butanol | 45 |
| Acrylic B @ 35% solids in water | 571 |
| Cymel 5010 @ 66% solids in butanol | 152 |
| RSN 217 silicone @ 70% solids in butanol | 357 |
| D.I. Water | 176 |
| | 1410 |
| Total | 3333 |

Example 2

Coating composition B was made as described for Example 1 by mixing the ingredients shown below.

| Coating B Resin Solids | |
|---|---|
| cresol phenolic A | 25 |
| Acrylic A | 5 |
| Epoxidized soya bean oil | 7.5 |
| Epikure 3115 | 7.5 |
| Acrylic B | 17.5 |
| Cymel 5010 | 7.5 |
| RSN 217 silicone | 30 |
| | 100 |

| Coating B Solution in Water | |
|---|---|
| cresol phenolic A @ 62% solids in butanol | 403 |
| Acrylic A @52% solids in butyl cellosolve | 96 |
| Epoxidized soya bean oil | 75 |
| Epikure 3115 @ 80% solids in butanol | 94 |
| Acrylic B @ 35% solids in water | 500 |
| Cymel 5010 @ 66% solids in butanol | 121 |
| RSN 217 silicone @ 70% solids in butanol | 429 |
| D.I. Water | 1615.0 |
| Total | 3333 |

Example 3

Coating composition C was made as described in Example 1 by mixing the ingredients shown below.

| Coating C Resin Solids | |
|---|---|
| cresol phenolic B[5] | 25 |
| Acrylic A | 3 |
| Epoxidized soya bean oil | 15 |
| Epikure 3115 | 5 |
| Acrylic B | 27 |
| Cymel 5010 | 10 |
| RSN 217 silicone | 15 |
| | 100 |

[5]Cresol phenolic B = PR520 from Allnex 62% solids

| Coating C Solution in Water | |
|---|---|
| cresol phenolic B @ 62% solids in butanol | 403 |
| Acrylic A @ 52% solids in butanol | 58 |
| Epoxidized soya bean oil | 150 |
| Epikure 3115 @ 80% solids in butanol | 50 |
| Acrylic B @ 35% solids in water | 771 |
| Cymel 5010 @ 66% solids in butanol | 152 |
| RSN 217 silicone @ 70% solids in butanol | 214 |
| D.I. Water | 1535.0 |
| Total | 3333 |

Example 4

Coating composition D was made as described in Example 1 by mixing the ingredients shown below.

| Coating D Resin Solids | |
|---|---|
| Acrylic B | 18.5 |
| Epoxidized soya oil | 12.3 |
| Epikure3115 | 7.6 |
| RSN233 silicone[5] | 49 |
| Cymel 5010 | 12.6 |
| | 100 |

[5]RSN233 Silsesquioxane silicone from Dow

| Coating D Solution in Water | |
|---|---|
| Acrylic B solution in water @ 35% solids in butanol. | 529 |
| Epoxidized soya oil | 123 |
| Epikure 3115 @ 80% solids in butanol | 95 |
| RSN233 silicone @ 70% solids in butanol | 700 |
| Cymel 5010 @ 66% solids in butanol | 191 |
| D.I. water | 1696 |
| Total | 3333 |

Example 5

Coating composition E was made as described in Example 1 by mixing the ingredients shown below.

| Coating E Resin Solids | |
|---|---|
| Cresol phenolic B | 25 |
| Acrylic B | 20 |
| Epoxidized Soya Oil | 5 |
| EpiKure 3115 | 7.5 |
| Cymel5010 | 22.5 |
| RSN233 silicone | 20 |
| Total | 100 |

| Coating E Solution in Water | |
|---|---|
| Acrylic B solution in water @ 35% solids in butanol | 571 |
| Cresol phenolic B at 62% solids in butanol | 403 |
| Epoxidized soya oil | 50 |
| Epikure 3115 @ 80% solids in butanol | 94 |
| RSN233 silicone @ 70% solids in butanol | 286 |
| Cymel 5010 @ 66% solids in butanol | 341 |
| D.I. water | 1588 |
| Total | 3333 |

Example 6

Coating composition F was made by mixing the ingredients shown below.

| Coating F Resin Solids | |
|---|---|
| cresol phenolic A | 30 |
| Acrylic C | 5 |
| Epoxidized soya bean oil | 10 |
| Epikure 3115 | 10 |
| Acrylic D | 17 |
| Cymel 1123[6] | 12 |
| RSN 217 silicone | 16 |
| | 100 |

[6]Cymel 1123 = Benzoganime from Allnex

| Acrylic A Solids | |
|---|---|
| Methyl Methacrylate | 25% |
| Ethyl acrylate | 53% |
| Methacrylic acid | 22% |
| | 100% |

| Acrylic B Solids | |
|---|---|
| Methyl Methacrylate | 25% |
| Ethyl Acrylate | 42% |
| Methacrylic acid | 33% |
| | 100% |

Example 7

Coatings A-F were airless spray applied onto 300×407 can to a film weight of 280-300 MGS with a Sprimag commercial spray machine using Nordson MEG guns with the following dwell times and spray nozzles.

| Spray Parameters | | | |
|---|---|---|---|
| | Dwell Time in Milliseconds | Nozzle Type | Pressure |
| Gun #1 | 108 MS | 1097007 | 750 psi |
| Gun#2 | 100 Ms | 121999 | 800 psi |

Commercially available 2 piece water-based interior spray for food cans having the composition shown below were also sprayed in the same manner.

| Resin Solids | |
|---|---|
| Cresol phenolic A | 50 |
| Acrylic A | 10 |
| Epikure 3115 | 10 |
| Acrylic B | 20 |
| Cymel 5010 | 10 |
| | 100 |

| Commercial Coating in Water | |
|---|---|
| Cresol phenolic A @62% solids in butanol | 806 |
| Acrylic A 52% solids in butanol | 192 |
| Epikure 3115 @ 80% solids in butanol | 125 |
| Acrylic B @ 35% % solids in water | 571 |
| Cymel 5010 @ 66% % solids in butanol | 152 |
| D.I. water | 1486 |
| Total | 3333 |

The commercial coatings is 30% solids in water at a viscosity of 21 sec as measured by a #4 Ford cup at a temperature of 78° F.

The sprayed cans were cured in an inside bake oven at 425° F. for 5 minutes and put into test pack. For the test pack, commercially available Chicken Noodle Soup was heated to 160° F. then put into the sprayed and cured 300×407 cans with a 3/16 in headspace. An end was seamed on the cans. The cans were then steam processed at 250° F. for one hour. After processing, the cans were then cooled to room temperature overnight and finally stored at 120° F. for one or two weeks. Following either one or two weeks, as indicated below, corrosion was rated visually on a scale of 1-10 with 10 being no corrosion. A rating of 8.5 or higher is considered commercially acceptable.

The top of a DWI can is more prone to corrosion because of the reduced level of tin compared to the bottom of the can due to the drawing process.

The results obtained are shown below.

| Test Pack Results - Coating A - Coating C versus Commercial Coating | | | | | |
|---|---|---|---|---|---|
| Corrosion top ¼ in of 300 × 407 can | Corrosion top 1 inch of can | Corrosion top ¼ in of 300 × 407 can | Corrosion top 1 inch of can | Corrosion top ¼ in of 300 × 407 can | Corrosion top 1 inch of can |
| Coating A | | Coating B | | Coating C | |
| 1 Week at 120° F. | 1 Week at 120° F. | 1 Week at 120° F. | 1 Week at 120° F. | 1 Week at 120° F. | 1 Week at 120° F. |

| | Coating A | | Coating B | | Coating C | |
|---|---|---|---|---|---|---|
| Can1 | 10 | 10 | 8.5 | 8.7 | 10 | 9 |
| Can2 | 9.2 | 9.8 | 8.9 | 9.7 | 9.7 | 9 |
| Can3 | 9.7 | 9.3 | 9 | 9.5 | 9.7 | 9.8 |
| | 2 Weeks at 120° F. | 2 Weeks at 120° F. | 2 Weeks at 120° F. | 2 Weeks at 120° F. | 2 Weeks at 120° F.F | 2 Weeks at 120° F. |
| Can1 | 9.5 | 9.9 | 9.5 | 9.9 | 8.5 | 9.00 |
| Can2 | 9.7 | 9.9 | 8.6 | 8.6 | 9.5 | 9.7 |
| Can3 | 9.7 | 9.9 | 8.5 | 9.4 | 9.7 | 9.8 |
| | Commercial Coating | | Commercial Coating | | Commercial Coating | |
| | 1 Week at 120° F. | 1 Week at 120° F. | 1 Week at 120° F. | 1 Week at 120° F. | 1 Week at 120° F. | 1 Week at 120° F. |
| Can1 | 10 | 10 | 9.2 | 9.5 | 10 | 10 |
| Can2 | 10 | 10 | 10 | 9.9 | 10 | 10 |
| Can3 | 9.8 | 9.9 | 10 | 10 | 10 | 9.8 |
| | 2 Weeks at 120° F. | 2 Weeks at 120° F. | 2 Weeks at 120° F. | 2 Weeks at 120° F. | 2 Weeks at 120° F. | 2 Weeks at 120° F. |
| Can1 | 9.5 | 9.7 | 10 | 10 | 10 | 9.8 |
| Can2 | 8.9 | 9.9 | 9.8 | 9.9 | 9.7 | 9.7 |
| Can3 | 10.0 | 10 | 9.9 | 10 | 8.9 | 9.2 |

| Test Pack Results - Coating D and E versus Commercial Coating | | | |
|---|---|---|---|
| Corrosion top ¼ in of 300 × 407 can | Corrosion top 1 inch of can | Corrosion top ¼ in of 300 × 407 can | Corrosion top 1 inch of can |
| Coating D | | Coating E | |
| 1 Week at 120° F. | 1 Week at 120° F. | 1 Week at 120° F. | 1 Week at 120° F. |

| | Coating D | | Coating E | |
|---|---|---|---|---|
| Can 1 | 9.8 | 9.6 | 8.3 | 8.1 |
| Can 2 | 9.8 | 9.6 | 8.2 | 8 |
| Can 3 | 9.7 | 9.5 | 8.3 | 8.1 |
| | 2 Weeks at 120° F. | 2 Weeks at 120° F. | 2 Weeks at 120° F. | 2 Weeks at 120° F. |
| Can 1 | 9.6 | 9.4 | 8.1 | 7.9 |
| Can 2 | 9.7 | 9.5 | 7.9 | 7.7 |
| Can 3 | 9.5 | 9.3 | 7.8 | 7.7 |
| | Commercial Coating | | Commercial Coating | |
| | 1 Week at 120° F. | 1 Week at 120° F. | 1 Week at 120° F. | 1 Week at 120° F. |
| Can 1 | 9.4 | 9.3 | 9.8 | 9.7 |
| Can 2 | 10 | 9.9 | 10 | 10 |
| Can 3 | 10 | 10 | 10 | 9.8 |
| | 2 Weeks at 120° F. | 2 Weeks at 120° F. | 2 Weeks at 120° F. | 2 Weeks at 120° F. |

| Test Pack Results - Coating D and E versus Commercial Coating | | | |
|---|---|---|---|
| Can 1 | 10 | 10 | 10 | 9.8 |
| Can 2 | 9.8 | 9.9 | 9.7 | 9.7 |
| Can 3 | 9.9 | 10 | 8.9 | 9.2 |

| Test Pack Results - Coating F | Corrosion top ¼ in of 300 × 407 can | Corrosion top 1 inch of can |
|---|---|---|
| | 1 Week at 120° F. | 1 Week at 120° F. |
| Can 1 | 9.2 | 9.5 |
| Can 2 | 8.1 | 9.2 |
| Can 3 | 7.6 | 9.0 |
| | 2 Weeks at 120° F. | 2 Weeks at 120° F. |
| Can 1 | 6.8 | 8.6 |
| Can 2 | 7.8 | 9.0 |
| Can 3 | 7.6 | 8.9 |

As can be seen, the compositions of the present invention achieved commercially acceptable or near acceptable corrosion resistance with less phenolic than the commercial product; coating D, having no added phenolic, also performed to acceptable commercial standards.

Example 7

Coating E was airless spray applied onto 300×407 can to a film weight of 280-300 MGS with a Sprimag commercial spray machine using Nordson MEG guns with the dwell times and spray nozzles indicated in Example 6. The cans were tested for soup release using the following test:

Soup Release Test for thick condensed soup (green pea soup)
Tested in triplicate for each coating tested.
Repack Procedure
Heated soup to 130° F.
Put soup into test cans, leaving ¼ inch headspace
Steam processed 30 minutes at 250° F., end up
Cans allowed to air cool, end up, overnight, before testing for soup release
Cans were then placed in Hot Room, end up, for time indicated below.
After required time of storage, test cans were cooled before testing for soup release.
Soup Release Procedure
Tare balance with an empty can that has been side cut
Weighed test can of soup
Shake control can downward @ a 90° angle until soup falls out.
Test cans were given the same amount of consecutive shakes or until soup falls out of can, weight and number of shakes recorded
Soup Release Calculations
Start weight (end removed) A
Weight of can after shaking B
Amount of soup released C (A−B=C)

Calculated percentage of soup released
Commercially obtained Condensed Green Pea Soup, packaged in cans coated with a commercially available gold epoxy that does not contain silicone were also tested after hot room exposure. The table below reports the average percent of soup released and number of shakes.

| Coating E | Commercial Epoxy Gold |
|---|---|
| 2 weeks storage at 120° F. Average percent food release | |
| 98.6 | 0.01 |
| Average number of shakes to release food | |
| 7.7 | 15 |
| 4 weeks storage at 120° F. Average percent food release | |
| 98.9 | 0.1 |
| Average number of shakes to release food | |
| 5.0 | 66.7 |

As can be seen in the table, the ease of removing the food from a can, and the amount removed, is greatly increased using the silicone containing coating of the present invention, as compared with a commercially available product.

Whereas particular embodiments of this invention have been described above for purposes of illustration, it will be evident to those skilled in the art that numerous variations of the details of the present invention may be made without departing from the invention as defined in the appended claims.

What is claimed is:

1. A package coated at least in part with a coating composition comprising:
   a. epoxidized vegetable oil;
   b. an amine terminated polyamide; and
   c. a silicone resin comprising a phenyl group and having a phenyl to methyl ratio of 0.84:1 to 1.3:1 and/or a degree of substitution of 1 to 1.15;
   wherein the composition comprises 5 wt % or greater epoxidized vegetable oil, where wt % is based on the total solid weight of the composition.

2. The package of claim 1, wherein the coating composition further comprises 30 wt % or less phenolic resin, where weight percent is based on the total solid weight of the coating.

3. The package of claim 1, wherein the epoxidized vegetable oil comprises epoxidized soy bean oil.

4. The package of claim 3, wherein the composition comprises 10 to 13 wt % epoxidized soy bean oil, where wt % is based on the total solid weight of the composition.

5. The package of claim 1, wherein the composition further comprises an acrylic resin.

6. The package of claim 5, wherein the acrylic resin is formed from monomers comprising (meth)acrylic acid and alkyl acrylate.

7. The package of claim 1, wherein the polyamide has an amine value of 220 to 250, as determined by titration with HBr in HBr/Acetic acid using methyl violet indictor.

8. The package of claim 1, wherein the silicone comprises a silanol functional silsesquioxane silicone resin and the composition has 10 wt % or less phenolic resin, where wt % is based on the total solid weight of the coating.

9. The package of claim 8, wherein the composition has 5 wt % or less phenolic resin, where wt % is based on the total solid weight of the coating.

10. The package of claim 8, wherein the composition has 1 wt % or less phenolic resin, where wt % is based on the total solid weight of the coating.

11. The package of claim 1, wherein the coating composition further comprises benzoguanamine.

12. The package of claim 1, wherein the package is a metal can.

13. The package of claim 12, wherein the efficiency of food release from the metal can is greater than the efficiency of food release from a metal can coated with a coating without silicone.

14. The package of claim 1, wherein the composition does not include styrene, ethyl acrylate, and/or n-butoxy methyl acrylamide.

15. The package of claim 5, wherein the acrylic resin is formed from monomers comprising cyclic (meth)acrylate.

16. The package of claim 1 wherein the silicone resin is in an amount of 10 to 60 wt % based on the total solids weight of the composition.

17. The package of claim 1, wherein the polyamide is in an amount of 2 to 15 wt % based on the total solids weight of the composition.

* * * * *